Oct. 21, 1930.   A. NOIRIT   1,778,912

FASTENER FOR POWER TRANSMISSION BELTS

Filed Oct. 18, 1929

Albert Noirit
INVENTOR

BY C.A.Snow & Co.
ATTORNEYS.

Patented Oct. 21, 1930

1,778,912

UNITED STATES PATENT OFFICE

ALBERT NOIRIT, OF WALSALL, ENGLAND

FASTENER FOR POWER-TRANSMISSION BELTS

Application filed October 18, 1929, Serial No. 400,611, and in Great Britain June 12, 1929.

This invention comprises certain improvements in or relating to fasteners for power transmission belts, and it has for its object to provide a fastener which is strong, simple and cheap, easily fixed and whereby the liability of tearing the belt is reduced to a minimum.

According to the present improvements, the invention comprises two metal plates pivotally mounted together and is characterized in that such metal plates have tongues which are passed through slots or slits in the belt and bent round the inner side of the belt. Preferably each plate is bent upon itself to form a socket for the connecting pivot member, and a tongue (or tongues or projections) is provided on the outer portion of the bent plate and is passed through the belt to secure the tongue or tongues thereto. The latter tongue (or tongues) is, as hereinafter described, passed through a slot in the inner bent portion of the metal plate. A tongue (or tongues or projections) is also formed on the inner bent portion of the metal plate for passing through the belt. The connecting link for the two metal plates conveniently comprises a looped wire link. The tongues on the belt fastener thus described are, in the course of production, bent up in a press substantially at right angles to the metal plate and when the belt fastener is required to be fixed in position slits or slots are cut in the belt and the tongues passed therethrough, after which they are bent round the inner face of the belt.

Referring to the drawings:—

Figure 1:
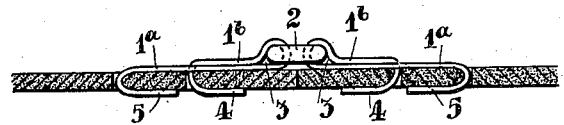
Figure 1 is a side elevation of a belt fastener constructed according to this invention.
Figure 2:
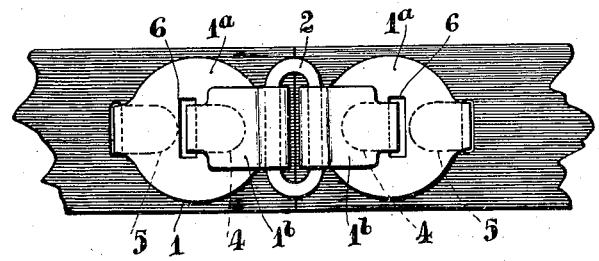
Figure 2 is a plan view of Figure 1.
Figures 3, 4:
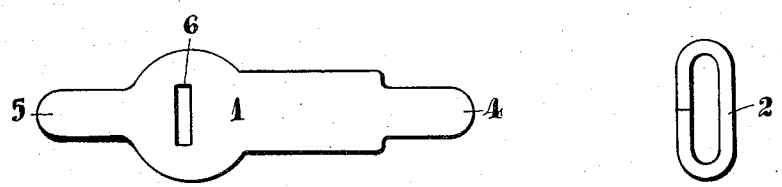
Figure 3 is a sheet metal blank from which the members of the belt fastener are formed.
Figure 4 is a view of the connecting pivot link.
Figure 5:
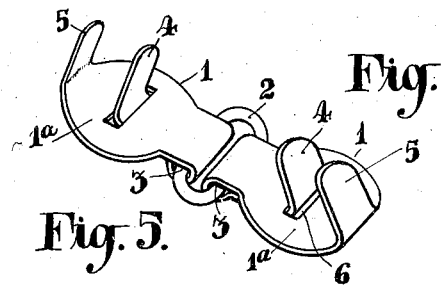
Figure 5 is a perspective view of the belt fastener before fixing to a belt.

According to a convenient embodiment of this invention, the belt fastener comprises two metal plates 1 which are pivotally connected together by a connecting link 2. Each plate is formed from a sheet metal blank as shown by Figure 3, and this sheet metal plate is bent upon itself to form the limbs 1$^a$ and 1$^b$ and to form the socket 3 which encloses the limb of the connecting link 2. Tongues 4 and 5 are shaped on the plate 1, and the tongue 4 is passed through the slot 6 which is located in the inner bent portion 1$^a$ of the plate 1. When manufactured the fastener is in the condition as shown by Figure 5, the tongues 4 and 5 being substantially at right angles to the fastener plate 1. To fix the fastener in position slots are first punched in the belt and the tongues 4 and 5 passed therethrough. The tongues are then hammered back into the position shown by Figure 1. As the metal is of comparatively thick gauge the tongues will be firmly fixed in the bent back securing position and will firmly grip the belt at the bend.

As both ends of the plate are securely anchored to the belt by the tongues 4 and 5 there will be no tendency for the bent back portions 1$^a$ and 1$^b$ to open out. As there are two comparatively wide tongues, 4 and 5 gripping the belt the liability of tearing is reduced to a minimum whilst as the tongues are made of comparatively stiff metal there will be no liability of the tongues becoming disengaged from the belt.

Claims:

1. A fastener for power transmission belts comprising two metal plates, a connecting link pivotally connecting the plates together and strips or tongues of metal bent from the metal plates and passed through the slits or slots formed transversely of the belt and turned back on the underside of the belt.

2. A fastener for power transmission belts comprising two sheet metal plates, each plate bent back on itself to form a socket at the bend, tongues on the outer portion of the bent back plates which are passed through slots formed transversely in the belt and bent back on the underside of the belt, and a connecting link pivotally engaging the said sockets in the plates.

3. A fastener for power transmission belts comprising two sheet metal plates each plate bent back on itself to form a socket at the bend, tongues on the outer portion of the bent back plates which are passed through slots in the inner portion of the bent back plates into position for passing through the belt, and a connecting link pivotally engaging the said sockets in the plates.

4. A fastener for power transmission belts comprising two sheet metal plates each plate bent back on itself to form a socket at the bend, tongues on the outer portion of the bent back plates which are passed through slots in the inner portion of the bent back plates into position for passing through the belt, tongues on the inner bent back portions of the plates which are adapted to be passed through slots in the belt, and a connecting link pivotally engaging the said sockets in the plates.

In witness whereof I have signed this specification at Birmingham, England.

ALBERT NOIRIT.